US012749740B2

(12) United States Patent
Hong et al.

(10) Patent No.: US 12,749,740 B2
(45) Date of Patent: Sep. 29, 2026

(54) POUCH FOR SECONDARY BATTERY INCLUDING REINFORCING PARTS

(71) Applicant: LG Energy Solution, Ltd., Seoul (KR)

(72) Inventors: Jeong Woo Hong, Daejeon (KR); Chung Hee Lee, Daejeon (KR); Sin Young Park, Daejeon (KR); Dong Hyeuk Park, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 700 days.

(21) Appl. No.: 18/026,726

(22) PCT Filed: Dec. 10, 2021

(86) PCT No.: PCT/KR2021/018805
§ 371 (c)(1),
(2) Date: Mar. 16, 2023

(87) PCT Pub. No.: WO2022/139287
PCT Pub. Date: Jun. 30, 2022

(65) Prior Publication Data

US 2023/0344040 A1 Oct. 26, 2023

(30) Foreign Application Priority Data

Dec. 23, 2020 (KR) ........................ 10-2020-0182647
Dec. 8, 2021 (KR) ........................ 10-2021-0174922

(51) Int. Cl.
*H01M 50/105* (2021.01)
*H01M 10/04* (2006.01)

(52) U.S. Cl.
CPC ....... *H01M 50/105* (2021.01); *H01M 10/049* (2013.01)

(58) Field of Classification Search
CPC .......................... H01M 50/105; H01M 10/049
See application file for complete search history.

(56) References Cited

U.S. PATENT DOCUMENTS

2006/0093905 A1 5/2006 Kim
2019/0305261 A1* 10/2019 Kim .................... H01M 10/647
(Continued)

FOREIGN PATENT DOCUMENTS

CN 110323364 A 10/2019
KR 100571269 B1 4/2006
(Continued)

OTHER PUBLICATIONS

International Search Report for PCT/KR2021/018805 mailed Mar. 21, 2022. 3 pages.

*Primary Examiner* — Jimmy Vo
(74) *Attorney, Agent, or Firm* — Lerner David LLP

(57) ABSTRACT

The present invention relates to a pouch for a secondary battery, in which one pouch and the other pouch are formed in a longitudinal direction, the pouch comprising: one accommodation groove and the other accommodation groove, which are formed in one surface of the one pouch and one surface of the other pouch, which correspond to each other, respectively; one reinforcing part formed on the other surface of the one pouch and configured to reinforce strength so that the other surface of the one pouch is not curled or bent in a direction of the one accommodation groove; and the other reinforcing part formed on the other surface of the other pouch and configured to reinforce strength so that the other surface of the other pouch is not curled or bent in a direction of the other accommodation groove.

6 Claims, 15 Drawing Sheets

(56) References Cited

U.S. PATENT DOCUMENTS

| | | | |
|---|---|---|---|
| 2020/0067029 | A1 | 2/2020 | Park et al. |
| 2020/0373535 | A1 | 11/2020 | Jo |

FOREIGN PATENT DOCUMENTS

| | | | |
|---|---|---|---|
| KR | 20140132528 | A | 11/2014 |
| KR | 20170101650 | A | 9/2017 |
| KR | 20170136880 | A | 12/2017 |
| KR | 20180118929 | A | 11/2018 |
| KR | 20190024755 | A | 3/2019 |
| KR | 20190038094 | A | 4/2019 |
| KR | 20200025909 | A | 3/2020 |
| KR | 102137706 | B1 | 7/2020 |

* cited by examiner

POUCH FOR SECONDARY BATTERY INCLUDING REINFORCING PARTS

CROSS-REFERENCE TO RELATED APPLICATION

The present application is a national stage entry under 35 U.S.C. § 371 of International Application No. PCT/KR2021/018805, filed on Dec. 10, 2021, which claims priority to Korean Patent Application Nos. 10-2020-0182647, filed on Dec. 23, 2020, and 10-2021-0174922, filed on Dec. 8, 2021, the disclosures of which are hereby incorporated by reference herein in their entireties.

TECHNICAL FIELD

The present invention relates to a pouch for a secondary battery, a method for manufacturing the same, and a method for manufacturing a secondary battery, and more particularly, to a pouch for a secondary battery, in which curling such as being rolled or bent is prevented, a method for manufacturing the same, and a method for a secondary battery.

BACKGROUND ART

In general, secondary batteries refer to chargeable and dischargeable batteries, unlike primary batteries that are not chargeable. The secondary batteries are being widely used in the high-tech electronic fields such as mobile phones, notebook computers, and camcorders.

Also, such a secondary battery is classified into a can type secondary battery in which an electrode assembly is built in a metal can and a pouch type secondary battery in which an electrode assembly is built in a pouch. The pouch type secondary battery comprises an electrode assembly, an electrolyte, and a pouch accommodating the electrode assembly and the electrolyte.

In addition, in the electrode assembly, a positive electrode and a negative electrode are disposed with a separator therebetween, a positive electrode tab is provided on the positive electrode, and a negative electrode tab is provided on the negative electrode. In addition, an electrode lead is coupled to each of the positive electrode tab and the negative electrode tab.

In addition, the pouch comprises an accommodation part accommodating the electrode assembly, a gas collection part collecting a gas generated in the accommodation part, and a sealing part sealing the accommodation part and the gas collection part.

However, in the case of the pouch, there is a problem in that, during a forming process for forming the accommodating part, a curl phenomenon, in which a region excluding the accommodating part, that is, a region of the gas pocket part is curled or bent due to residual stress, occurs. Particularly, due to the curl phenomenon occurring in the pouch, an interference occurring during the process of manufacturing the secondary battery, there are problems, in which sealing defects occur, and an equipment operation is deteriorated.

DISCLOSURE OF THE INVENTION

Technical Problem

An object of the prevent invention for solving the above problems is to provide a pouch for a secondary battery, which comprises a reinforcing part that reinforces strength of a region, in which a gas pocket part is formed, to prevent a curl phenomenon, in which the region, in which the gas pocket part is formed, is curled or bent, from occurring, and accordingly, to prevent sealing defects and deterioration of an equipment operation from occurring, a method for manufacturing the same, and a method for manufacturing a secondary battery.

Technical Solution

A pouch for a secondary battery, in which one pouch and the other pouch are formed in a longitudinal direction, according to the present invention for achieving the above object comprises: one accommodation groove and the other accommodation groove, which are formed in one surface of the one pouch and one surface of the other pouch, which correspond to each other, respectively; one reinforcing part formed on the other surface of the one pouch and configured to reinforce strength so that the other surface of the one pouch is not curled or bent in a direction of the one accommodation groove; and the other reinforcing part formed on the other surface of the other pouch and configured to reinforce strength so that the other surface of the other pouch is not curled or bent in a direction of the other accommodation groove.

The one reinforcing part may be formed at each of both sides of the other surface of the one pouch, and the other reinforcing part may be formed at each of both sides of the other surface of the other pouch.

Both ends of the one reinforcing part may extend lengthily in the longitudinal direction of the pouch to reinforce the strength so that the other surface of the one pouch is not curled or bent in the direction of the one accommodation groove.

When the pouch is viewed in a width direction, one end of the one reinforcing part of the one pouch may be provided to overlap the one accommodation groove by a set length.

Both ends of the other reinforcing part may extend lengthily in the longitudinal direction of the pouch to reinforce the strength so that the other surface of the other pouch is not curled or bent in the direction of the other accommodation groove.

When the pouch is viewed in a width direction, one end of the other reinforcing part of the other pouch may be provided to overlap the other accommodation groove by a set length.

The one reinforcing part may be formed to protrude in one direction of the one pouch, and the other reinforcing part may be formed to protrude in the other direction of the other pouch, which is a direction opposite to the one reinforcing part, and when the one pouch and the other pouch overlap each other, a groove portion of the one reinforcing part is fitted to be coupled to a protrusion portion of the other reinforcing part.

A method for manufacturing a pouch for a secondary battery according to the present invention comprises: a process (a) of preparing a pouch sheet in which one pouch and the other pouch are formed to correspond to each other in a longitudinal direction; a process (b) of forming one accommodation groove and the other accommodation groove in one surface of the one pouch and one surface of the other pouch, which correspond to each other, respectively; and a process (c) of forming one reinforcing part on the other surface of the one pouch to reinforce strength so that the other surface of the one pouch is not curled or bent in a direction of the one accommodation groove, and forming the other reinforcing part on the other surface of the other pouch to reinforce strength so that the other surface of the other pouch is not curled or bent in a direction of the other accommodation groove.

In the process (c), the one reinforcing part may be formed at each of both sides of the other surface of the one pouch, and both ends of the one reinforcing part extend lengthily in the longitudinal direction of the pouch sheet to reinforce the strength so that the other surface of the one pouch is not curled or bent in the direction of the one accommodation groove.

In the process (c), the other reinforcing part may be formed at each of both sides of the other surface of the other pouch, and both ends of the other reinforcing part extend lengthily in the longitudinal direction of the pouch sheet to reinforce the strength so that the other surface of the other pouch is not curled or bent in the direction of the other accommodation groove.

The process (b) and the process (c) may be performed at the same time.

In the process (c), the one reinforcing part or the other reinforcing part may be formed by forming the outer surface of the one pouch or the other surface of the other pouch in an embossed form.

The method may further comprise, after the process (c), a process (d) of folding the one pouch and the other pouch to overlap each other so as to complete the pouch.

In the process (c), the one reinforcing part may be formed to protrude in one direction of the pouch sheet, and the other reinforcing part may be formed to protrude in the other direction of the pouch sheet, which is a direction opposite to the one reinforcing part, the process (d) may comprise a process of bending the pouch sheet so that the one pouch and the other pouch are disposed to correspond to each other, a process of coupling a groove portion of the one reinforcing part to a protrusion portion of the other reinforcing part so that an end of the one pouch and an end of the other pouch match each other, and a process of folding a boundary line between the one pouch and the other pouch so that the one pouch and the other pouch overlap each other.

A method for manufacturing a secondary battery according to the method comprises: a process (A) of manufacturing a pouch; a process (B) of cutting and removing the one reinforcing part and the other reinforcing part, which are formed on the pouch; a process (C) of accommodating an electrode assembly between the one accommodation groove and the other accommodation groove of the pouch; and a process (D) of sealing an edge surface of the pouch to complete the secondary battery.

Advantageous Effects

The pouch for the secondary battery according to the present invention may comprise the reinforcing part to prevent the curl phenomenon, in which the region excluding the region, in which the accommodation groove is formed, in the pouch is curled or bent, from occurring, and accordingly, to prevent the sealing defects and the deterioration of the equipment operation from occurring.

MODE FOR CARRYING OUT THE INVENTION

Figure 1:
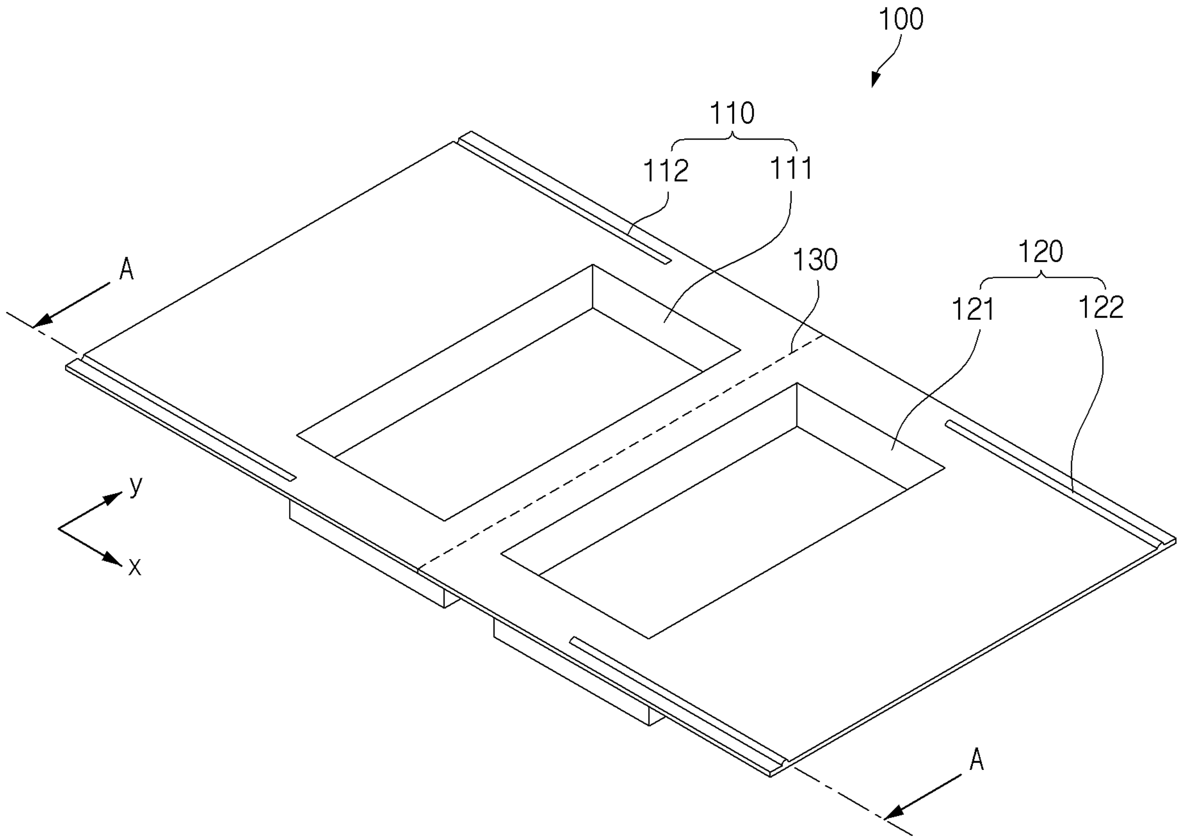
FIG. 1 is a perspective view illustrating a state in which a pouch for a secondary battery is spread out according to a first embodiment of the present invention.
Figure 2:
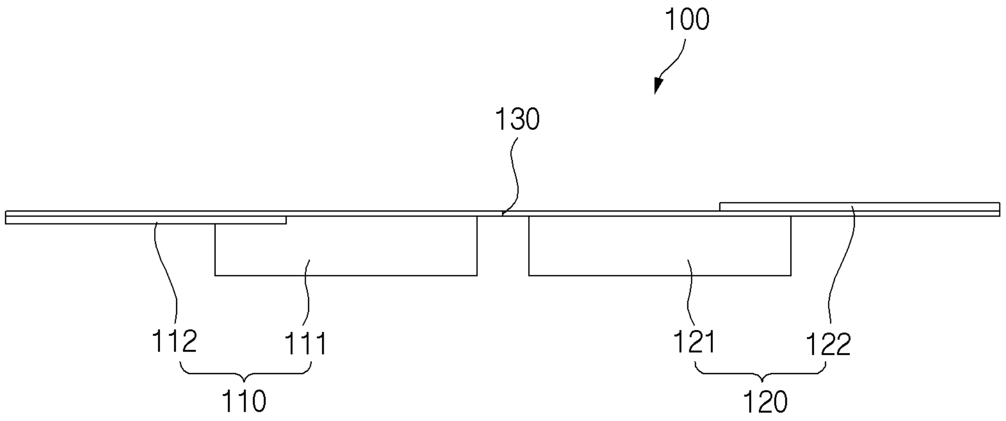
FIG. 2 is a side view of FIG. 1.
Figure 3:
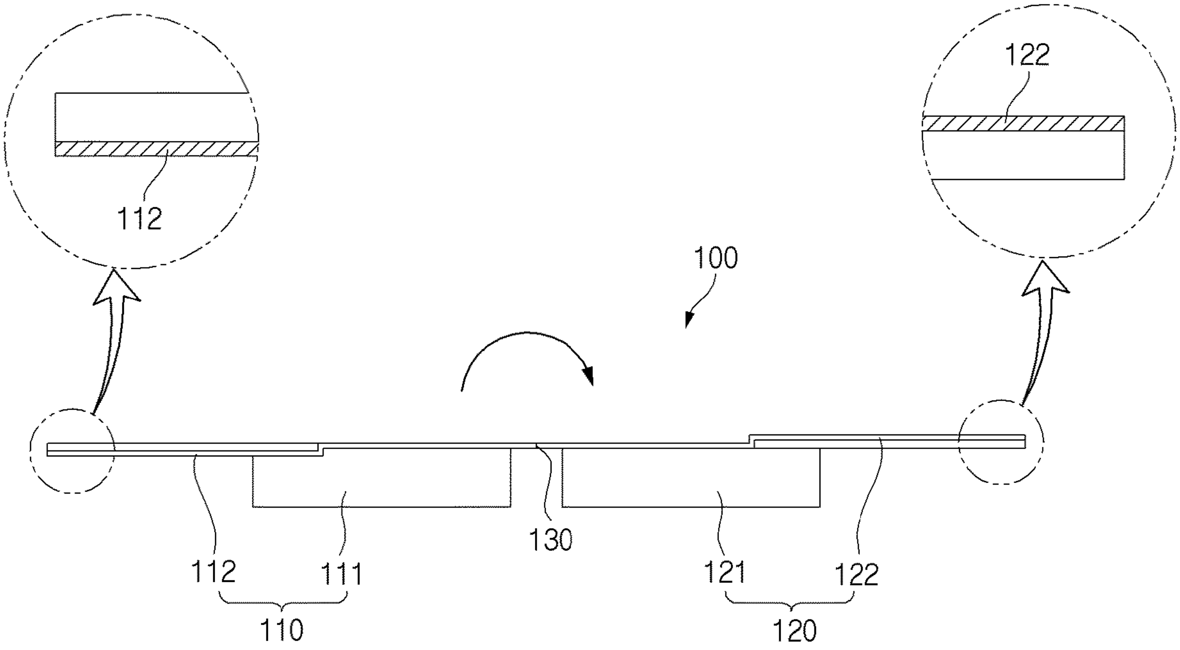
FIG. 3 is a cross-sectional view taken along line A-A of FIG. 1.

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

Pouch for Secondary Battery According to First Embodiment of the Present Invention A pouch 100 for a secondary battery according to a first embodiment of the present invention is configured to accommodate an electrode assembly as illustrated in FIGS. 1 to 6 and has a structure, in which one pouch 100 in a longitudinal direction (a left and right direction when viewed in FIG. 2) and the other pouch 120 are formed to correspond to each other. In addition, the one pouch 110 and the other pouch 120 are integrally connected to each other with respect to a boundary line 130.

Figure 4:
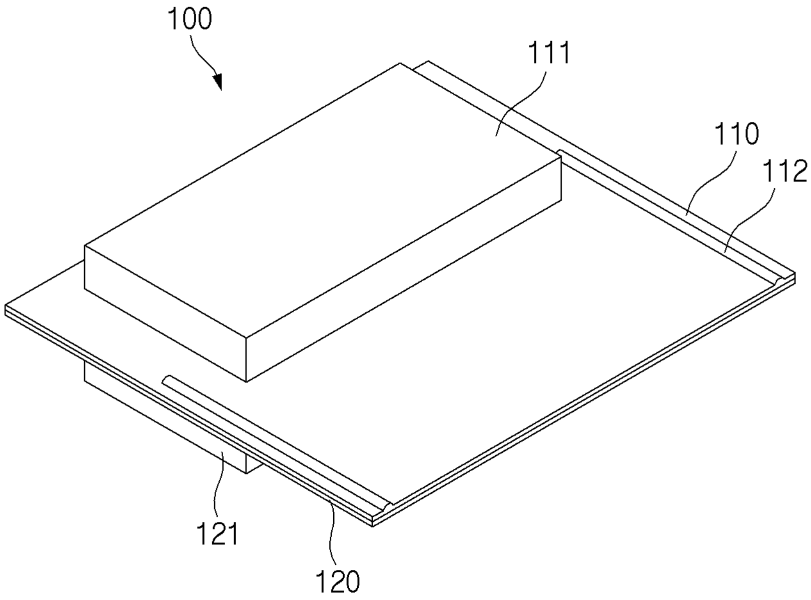
FIG. 4 is a perspective view illustrating a state in which the pouch for the secondary battery is assembled according to the first embodiment of the present invention.
Figure 5:
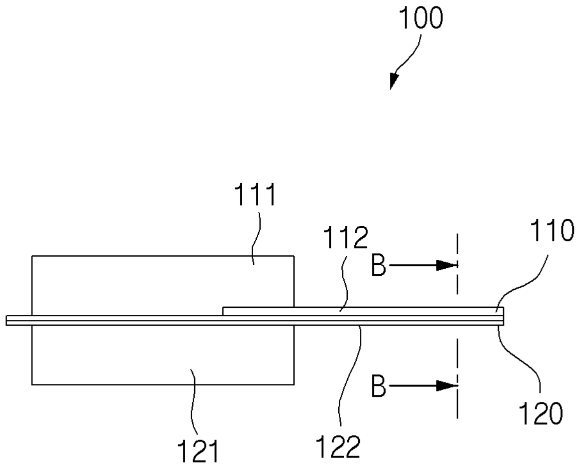
FIG. 5 is a side view of FIG. 4.
Figure 6:
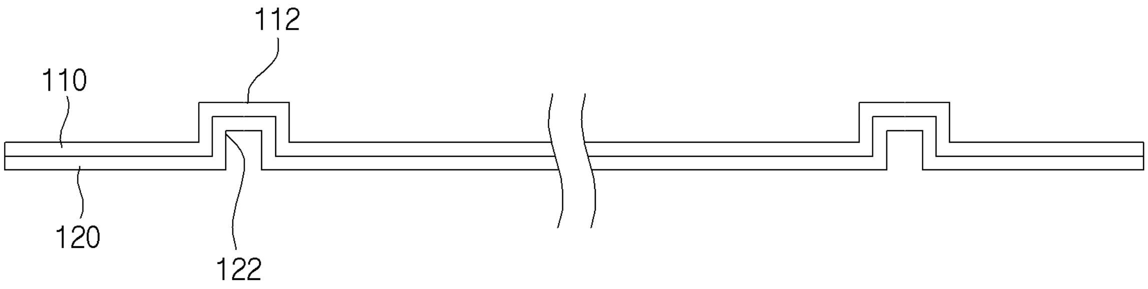
FIG. 6 is a cross-sectional view taken along line B-B of FIG. 5.
Figure 7:
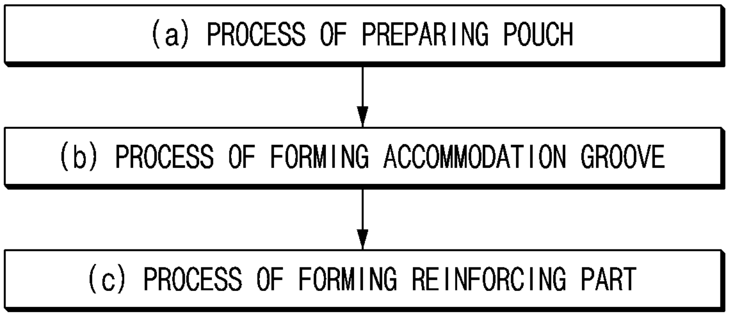
FIG. 7 is a flowchart illustrating a method for manufacturing the pouch for the secondary battery according to the first embodiment of the present invention.
Figure 8:
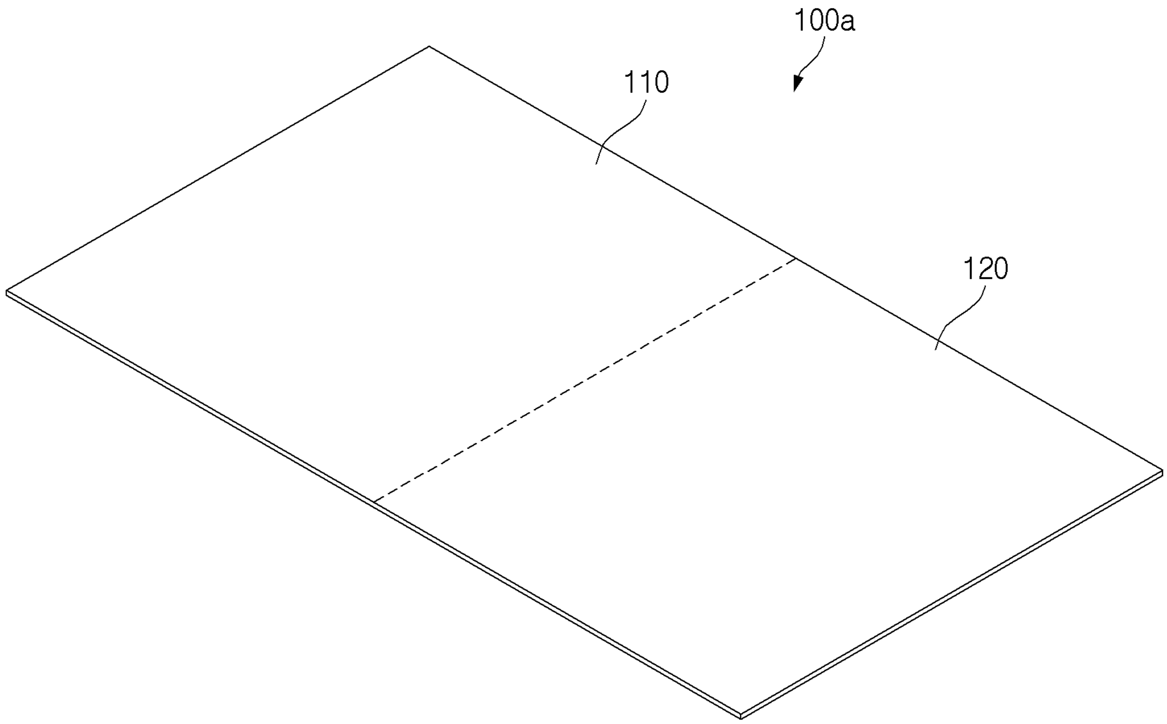
FIG. 8 is a perspective view illustrating a process of preparing a pouch.
Figure 9:
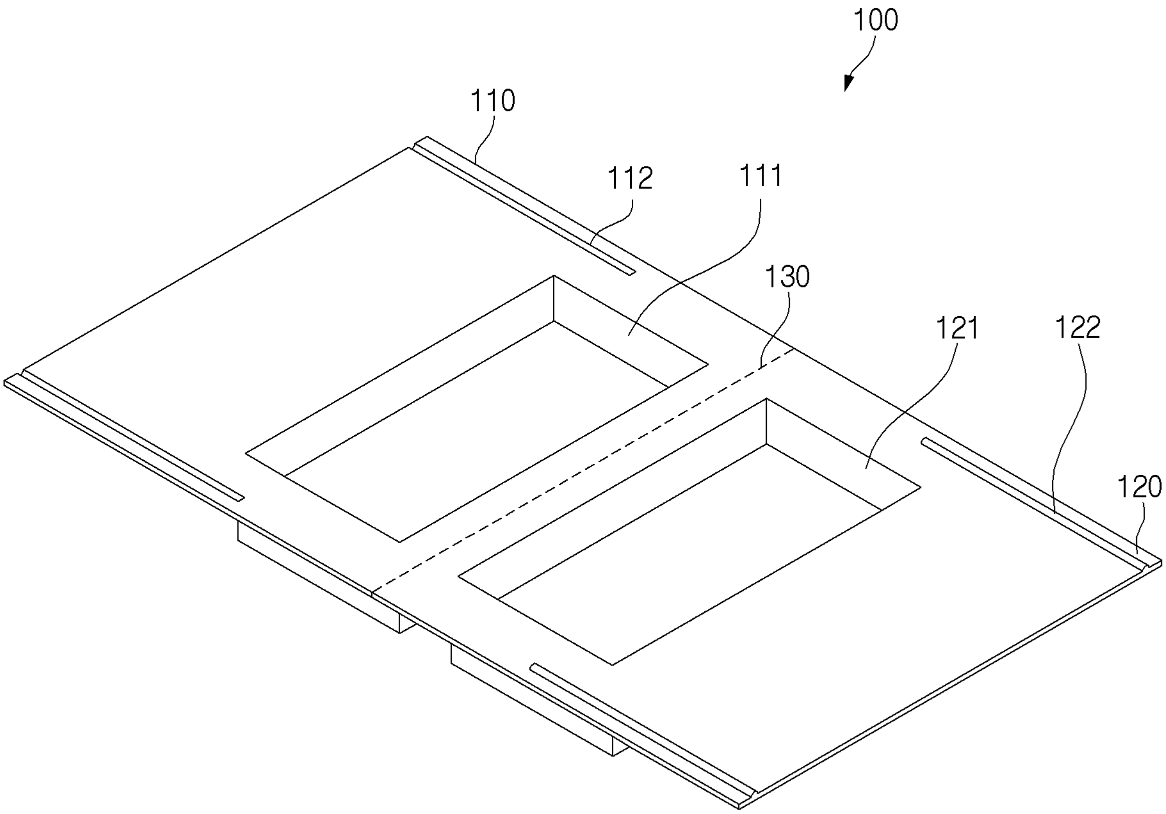
FIG. 9 is a perspective view illustrating a process of forming an accommodation groove and a reinforcing part.
Figure 10:
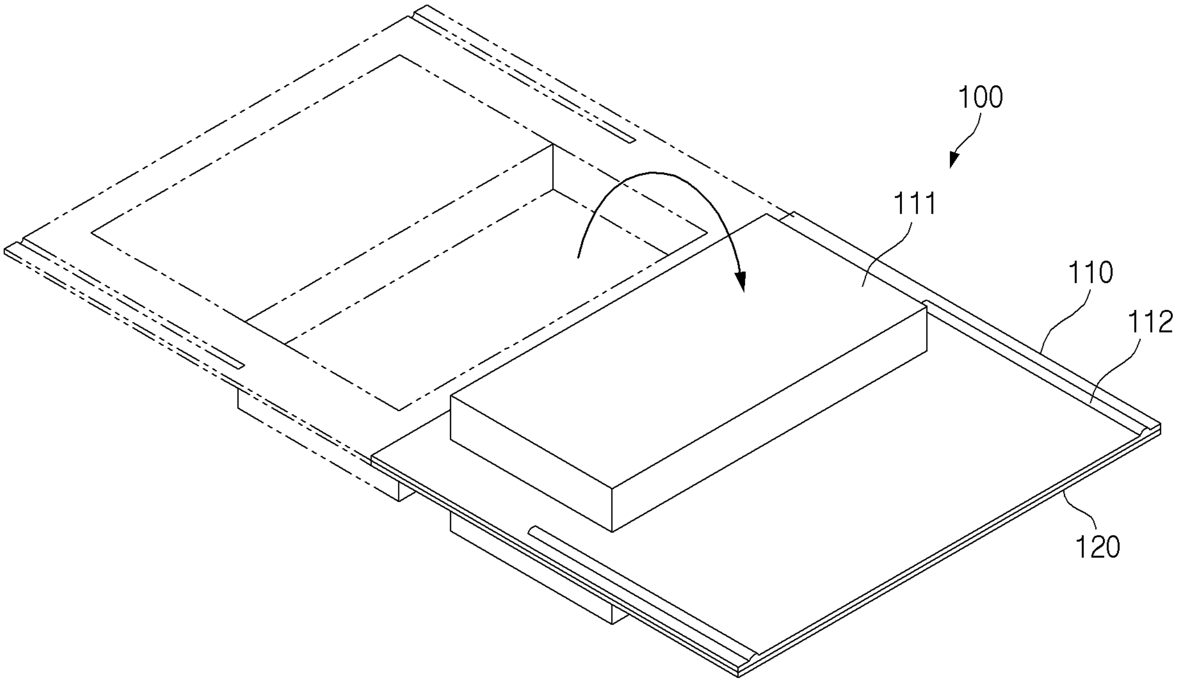
FIG. 10 is a perspective view illustrating a process of folding the pouch.
Figure 11:
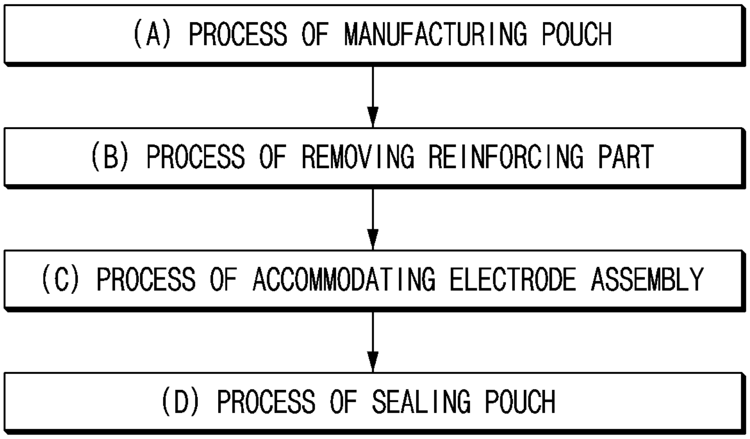
FIG. 11 is a flowchart illustrating a method for manufacturing the second battery according to the second embodiment of the present invention.

That is, as illustrated in FIG. 4, the pouch 100 for the secondary battery according to the first embodiment of the present invention has a structure, in which the one pouch 110 and the other pouch 120 symmetrically overlap each other with respect to the boundary line 130.

Here, one accommodation groove 111 and the other accommodation groove 121 are formed in one surface of the one pouch 110 (a right surface of the one pouch when viewed in FIG. 2) and one surface of the other pouch 120 (a left surface of the other pouch as viewed in FIG. 2), which are disposed close to the boundary line 130, respectively. That is, one accommodation groove 111 for accommodating one end of the electrode assembly is formed in one surface of the one pouch 110, and the other accommodation groove

121 for accommodating the other end of the electrode assembly is formed in one surface of the other pouch 120.

As an example, referring to FIG. 4, it has a structure in which one pouch 110 and the other pouch 120 are disposed in a vertical direction with respect to the boundary line 130. Here, one accommodation groove 111 and the other side accommodation groove 121 are connected in a vertical direction to form an accommodation part for accommodating the electrode assembly.

Also, a gas pocket region for forming a gas pocket part that collects a gas is defined in each of the other surface (left surface of the one pouch when viewed in FIG. 2) of the one pouch 110 disposed far from the boundary line 130 and the other surface (right surface of the other pouch when viewed in FIG. 2) of the other pouch 120.

The pouch 100 for the secondary battery forms one surface of the pouch 110 on one surface of the other pouch 120 to mold one accommodation groove 111 and the other accommodation groove 121. Here, since stress occurring when the accommodation grooves are formed remains in the other surface of the one pouch 110 and the other surface of the other pouch 120, there is a problem in which a curl phenomenon such as being curled or bent in the direction of the accommodation grooves occurs.

In order to solve the above problem, the pouch 100 for the secondary battery according to the first embodiment of the present invention comprises one reinforcing part 112 and the other reinforcing part 122, which reinforce strength, on the other surface of the one pouch 110 and the other surface of the other pouch 120.

That is, one reinforcing part 112 for reinforcing strength is formed on the other surface of the one pouch 110. Thus, the one reinforcing part 112 may reinforce the strength so that the other surface of the one pouch 110 is not curled or bent in the direction of the one accommodation groove 111, and as a result, the curl phenomenon may be prevented from occurring.

In addition, the other reinforcing part 122 for reinforcing strength is formed on the other surface of the other pouch 120. Thus, the other reinforcing part 122 may reinforce the strength so that the other surface of the other pouch 120 is not curled or bent in the direction of the other accommodation groove 121, and as a result, the curl phenomenon may be prevented from occurring.

The one reinforcing part 112 may be formed symmetrically on both sides of the other surface of the one pouch 110 in a y-axis direction illustrated in FIG. 1, and thus, the curl phenomenon may be prevented from occurring on both sides of the other surface of the one pouch 110. In addition, the other reinforcing part 122 may be formed symmetrically on both sides of the other surface of the other pouch 120 in the y-axis direction illustrated in FIG. 1, and thus, the curl phenomenon may be prevented from occurring on both sides of the other surface of the other pouch 120. That is, the one reinforcing part 112 and the other reinforcing part 122 may maintain the other surface of the one pouch and the other surface of the other pouch in a flat state.

Both ends of the one reinforcing part 112 and the other reinforcing part 122 may extend lengthily in a longitudinal direction of the pouch 100, and thus, the curl phenomenon, in which the other surface of the one pouch 110 and the other surface of the other pouch are curled or bent in the direction of the accommodation grooves may be effectively prevented from occurring.

In other words, the one reinforcing part 112 and the other reinforcing part 122 may be formed linearly along the longitudinal direction of the pouch.

The one reinforcing part and the other reinforcing part may be formed by forming each of the surfaces of the one pouch and the other pouch in an embossed form.

When the pouch is viewed in the width direction (viewed in the y-direction illustrated in FIG. 1), one end of the one reinforcing part 112 extends in a straight line to overlap the one accommodation groove 111 by a set length, and the other end extends to match an end of the other surface of the one pouch. Thus, it is possible to reinforce the strength between the one surface and the other surface of the one pouch, and as a result, it is possible to prevent the curl phenomenon from occurring between the one surface and the other surface of the one pouch.

When the pouch is viewed in the width direction (viewed in the y-direction illustrated in FIG. 1), one end of the other reinforcing part 122 extends in a straight line to overlap the other accommodation groove 121 by a set length, and the other end extends to match an end of the other surface of the other pouch. Thus, it is possible to reinforce the strength between the one surface and the other surface of the other pouch, and as a result, it is possible to prevent the curl phenomenon from occurring between the one surface and the other surface of the other pouch.

The pouch 100 for the secondary battery according to the first embodiment of the present invention having the structure as described above may prevent the curl phenomenon from occurring on the other surface of the pouch even though the one surface of the pouch is formed to mold the one accommodation groove and the other accommodation groove.

In the pouch 100 for the secondary battery according to the first embodiment of the present invention, the one reinforcing part 112 is formed to protrude in one direction (direction of a bottom surface of the pouch when viewed in FIG. 1) of the pouch 100, and the other reinforcing part 122 may be formed to protrude in the other direction (direction of a top surface of the pouch when viewed in FIG. 1) of the pouch 100, which is a direction opposite to the one reinforcing part. Thus, when the one pouch 110 and the other pouch 120 overlap each other, the one accommodation groove 111 of the one pouch 110 and the other accommodation groove 121 of the other pouch 120 are connected to each other to form an electrode assembly accommodation part. Particularly, a groove portion (a bottom surface portion of the one reinforcing part as viewed in FIG. 6) of the one reinforcing part 112 of the one pouch 110 may be fitted into and coupled to a protrusion portion (a top surface portion of the other reinforcing part when viewed in FIG. 6) of the other reinforcing part 122 of the other pouch 120. Thus, the one pouch 110 and the other pouch 120 may be folded to overlap each other without a separate equipment.

Hereinafter, a method for manufacturing the pouch for the secondary battery according to the first embodiment of the present invention will be described.

Method for Manufacturing Pouch for Secondary Battery According to First Embodiment of the Present Invention As illustrated in FIGS. 7 to 10, a method for manufacturing a pouch for a secondary battery according to the first embodiment of the present invention comprises a process (a) of preparing a pouch sheet, a process (b) of forming an accommodation groove, and a process (c) of forming a reinforcing part.

In the process (a) of preparing the pouch sheet, a pouch sheet 100*a* in which one pouch 110 and the other pouch 120 are formed to correspond to each other in a longitudinal direction is prepared. That is, referring to FIG. 8, in the pouch sheet 100*a*, the one pouch 110 is provided at a left side with respect to a central boundary line 130, and the other pouch 120 is provided at a right side with respect to the central boundary line 130.

In the process (b) of forming the accommodation groove, one surface (left surface close to the boundary line 130 when viewed in FIG. 9) of the one pouch 110 and one surface (right surface close to the boundary line 130 when viewed in FIG. 9) of the other pouch 120, which correspond to each other, are formed to form the one accommodation groove 111 and the other accommodation groove 121. That is, one accommodation groove 111 is formed in one surface of the one pouch 110, and the other accommodation groove 121 is formed in one side of the other pouch 120.

In the process (c) of forming the reinforcing part, one reinforcing part 112 and the other reinforcing part 122 are formed on the other surface (right surface of the one pouch when viewed in FIG. 9) of the one pouch 110 and the other surface (left surface of the other pouch when viewed in FIG. 9) of the other pouch 120, respectively.

That is, the one reinforcing part 112 is formed on the other surface of the one pouch 110, and the other reinforcing part 122 is formed on the other surface of the other pouch 120.

Thus, the one reinforcing part 112 and the other reinforcing part 122 may reinforce the strength of the other surface of the one pouch 110 and the other surface of the other pouch 120, and accordingly, the curl phenomenon in which the other surface of the one pouch 110 and the other surface of the other pouch 120 are curled or bent in the direction of the one accommodation groove 111 and the other accommodation groove 121 may be prevented from occurring.

In the process (c), the one reinforcing part 112 may be formed symmetrically on both sides of the other surface of the one pouch 110. Here, both ends of the one reinforcing part 112 may extend lengthily in the longitudinal direction of the pouch sheet 100*a* to significantly reinforce the strength so that the other surface of the one pouch 110 is not curled or bent in the direction of the one accommodation groove 111.

In the process (c), one end of the one reinforcing part 112 extends in a straight line to partially overlap the one accommodation groove 111 when the one pouch is viewed from a side surface (that is, when viewed in the y-direction illustrated in FIG. 1), and the other end extends in a straight line up to an end of the one pouch. Thus, it is possible to reinforce the strength between the one surface and the other surface of the one pouch.

In addition, in the process (c), the other reinforcing part 122 may be formed symmetrically on both sides of the other surface of the other pouch 120. Here, both ends of the other reinforcing part 122 may extend lengthily in the longitudinal direction of the pouch sheet 100*a* to significantly reinforce the strength so that the other surface of the other pouch 120 is not curled or bent in the direction of the other accommodation groove 121.

One end of the other reinforcing part 122 extends in a straight line to partially overlap the other accommodation groove 121 when the one pouch is viewed from a side surface (that is, when viewed in the y-direction illustrated in FIG. 1), and the other end extends in a straight line up to an end of the pouch. Thus, it is possible to significantly reinforce the strength between the one surface and the other surface of the other pouch.

Particularly, the process (b) and the process (c) may be performed at the same time. That is, one surface of the one pouch 110 and one surface of the other pouch 120 are formed to form the one accommodation groove 111 and the other side accommodation groove 121, and simultaneously, the one reinforcing part 112 and the other reinforcing part 122 are formed on the other surface of the one pouch 110 and the other surface of the other pouch 120. Thus, it is possible to prevent the other surface of the pouch from being curled or bent when the accommodation groove is formed in one surface of the pouch.

In the process (c), the one reinforcing part 112 or the other reinforcing part 122 may be formed by forming the other surface of the one pouch 110 or the other surface of the other pouch 120 in an embossed form to improve easiness of the operation.

The one reinforcing part 112 may be formed to protrude in one direction of the pouch sheet 100*a*, and the other reinforcing part 122 may be formed to protrude in the other direction of the pouch sheet, which is a direction opposite to the one reinforcing part. That is, the one reinforcing part 112 and the other reinforcing part 122 are formed to protrude in the directions opposite to each other. Here, the one reinforcing part 112 and the other reinforcing part 122, which protrude in opposite directions may be fitted to be coupled to each other when the one pouch and the other pouch overlap each other, thereby improving bondability between the one pouch and the other pouch.

After the process (c), a process (d) of folding the pouch is further performed.

In the process (d), the one pouch 110 and the other pouch 120 are folded to overlap each other with respect to the boundary line 130, thereby completing the pouch 100.

That is, the process (d) comprises a process of bending the pouch sheet 100*a* so that the one pouch 110 and the other pouch 120 are disposed to correspond to each other, a process of coupling a groove portion (i.e., a space in a bottom surface of the one reinforcing part) of the one reinforcing part 112 to a protrusion portion (i.e., a protrusion surface of a top surface of the other reinforcing part) of the other reinforcing part 122 so that an end of the one pouch 110 and an end of the other pouch 120 match each other, and a process of folding the one pouch 110 and the other pouch 120 with respect to the boundary line 130 between the one pouch 110 and the other pouch 120 so that the one pouch 110 and the other pouch 120 are disposed to correspond to each other.

Thus, the one accommodation groove and the other accommodation groove overlap one surface of the pouch to from the accommodation part, and the other surface of the one pouch and the other surface of the other pouch overlap the other surface to form the gas pocket part.

When the above processes are completed, the pouch 100 for the secondary battery of the present application may be manufactured.

Hereinafter, in descriptions of another embodiment of the present invention, constituents having the same function as the above-mentioned embodiment have been given the same reference numeral in the drawings, and thus duplicated description will be omitted.

Method for Manufacturing Secondary Battery According to Second Embodiment of the Present Invention As illustrated in FIGS. 11 to 15, a method for manufacturing a secondary battery according to a second embodiment of the present invention comprises a process (A) of manufacturing a pouch, a process (B) of removing a reinforcing part, a process (C) of accommodating an electrode assembly, and a process (D) of sealing the pouch.

Figure 12:
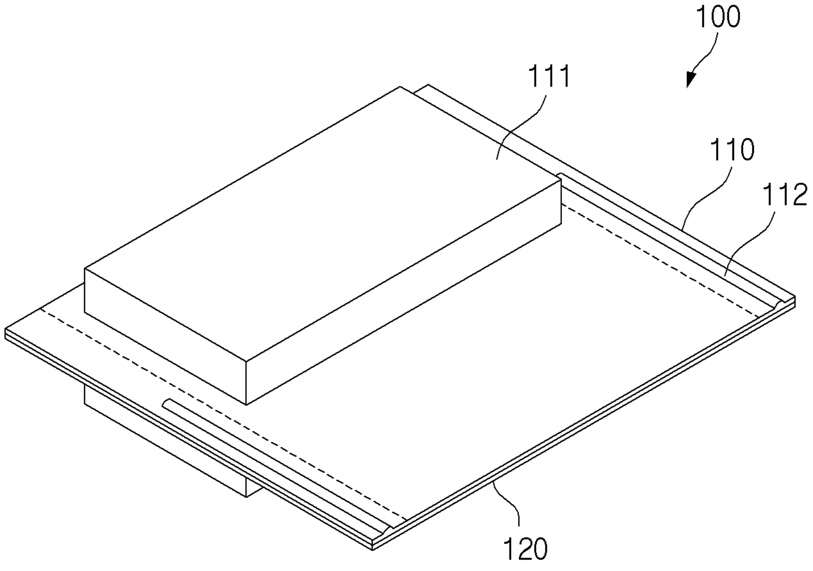
FIG. 12 is a perspective view illustrating a process of manufacturing the pouch.
Figure 13:
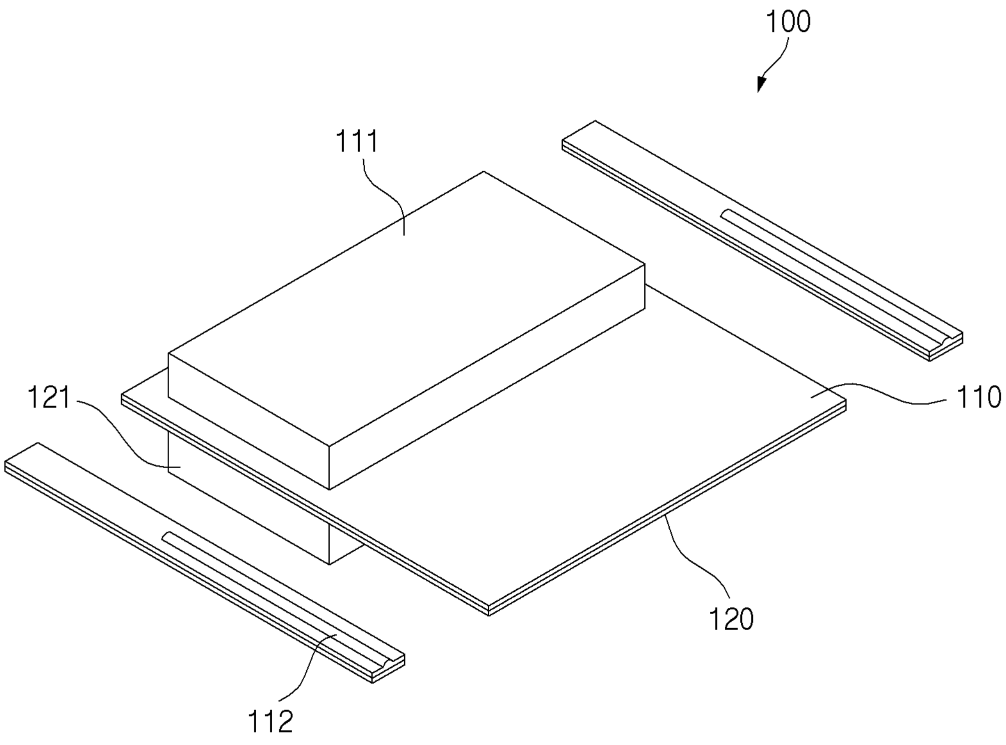
FIG. 13 is a perspective view illustrating a process of removing the pouch.
Figure 14:
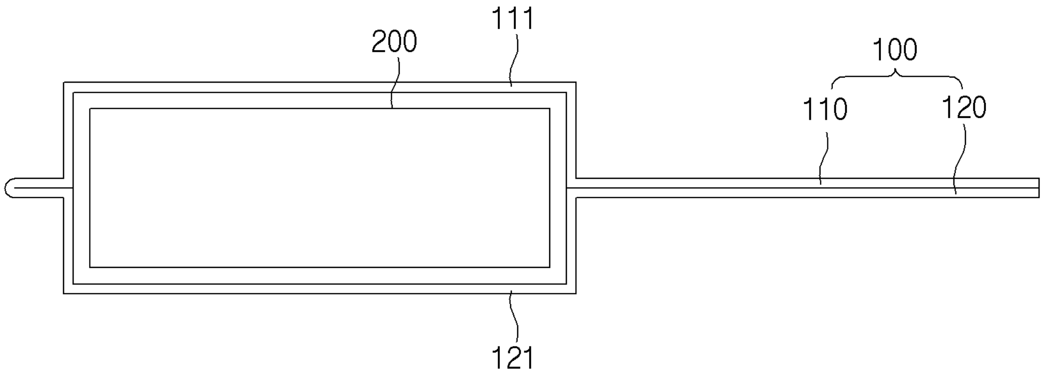
FIG. 14 is a cross-sectional view illustrating a process of accommodating an electrode assembly.

In the process (A), referring to FIG. 12, a pouch 100 in which one pouch 110 and the other pouch 120 are formed with respect to a boundary line 130 is manufactured.

The method for manufacturing the pouch is the same as the method of manufacturing the method for manufacturing the pouch according to the first embodiment described above, and accordingly, duplicated descriptions will be omitted.

In the process (B), the one reinforcing part 112 and the other reinforcing part 122, which are formed on the pouch 100 are cut and removed. That is, it is cut along a dotted line illustrated in FIG. 12. As a result, the one reinforcing part 112 and the other reinforcing part 122 may be removed from the pouch. The pouch may become a region for forming an accommodation part accommodating an electrode assembly by connecting one accommodation groove of one pouch to the other accommodation groove of the other pouch and may become a region for forming a gas pocket part by connecting the other surface of the one pouch to the other surface of the other pouch.

In the process (C), the electrode assembly 200 is accommodated between the one accommodation groove 111 and the other accommodation groove 121 of the pouch.

The process (B) and the process (C) may be performed in reverse order. That is, the electrode assembly may be accommodated between the one accommodation groove and the other accommodation groove of the pouch, and then, one reinforcing part and the other reinforcing part, which are formed in the pouch, may be cut and removed.

Figure 15:
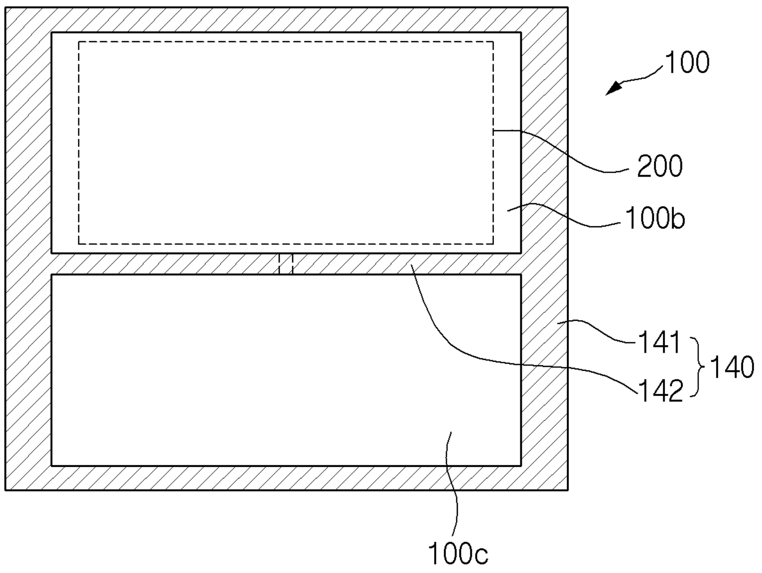
FIG. 15 is a plan view illustrating a process of sealing the pouch.

In the process (D), referring to FIG. 15, the pouch 100 is sealed to form a sealing part 140. That is, the sealing part 140 seals an edge surface of the pouch 100 to form a first sealing part 141, and simultaneously, the sealing part 140 seals a space between a region for forming the accommodation part and a region for forming the gas pocket part to form a second sealing part 142. As a result, the accommodation part 100*b* is formed at one side of the pouch 100, and the gas pocket part 100*c* is formed at the other side of the pouch 100, and as a result, the secondary battery according to the present invention is completed.

Accordingly, the scope of the present invention is defined by the appended claims more than the foregoing description and the exemplary embodiments described therein. Various modifications made within the meaning of an equivalent of the claims of the invention and within the claims are to be regarded to be in the scope of the present invention.

DESCRIPTION OF THE SYMBOLS

100: Pouch
110: One pouch
111: One accommodation groove
112: One reinforcing part
120: The other pouch
121: The other accommodation groove
122: The other reinforcing part
130: Boundary line

The invention claimed is:

1. A pouch for a secondary battery, comprising:
a first pouch portion and a second pouch portion;
a first accommodation groove and a second accommodation groove formed in a first surface of the first pouch portion and a first surface of the second pouch portion, respectively, the first and second accommodation grooves facing one another;
a first reinforcing part formed on a second surface of the first pouch portion and configured to prevent the first pouch portion from being curled or bent in a direction of the first accommodation groove; and
a second reinforcing part formed on a second surface of the second pouch portion and configured to prevent the second pouch portion from being curled or bent in a direction of the second accommodation groove,
wherein the first reinforcing part protrudes in one direction of the first pouch portion, and the second reinforcing part protrudes in another direction of the second pouch, which is a direction opposite to the one direction, and a groove portion of the first reinforcing part is coupled to a protrusion portion of the second reinforcing part.

2. The pouch of claim 1, wherein the first reinforcing part includes two sections disposed at opposite sides of the second surface of the first pouch portion, and the second reinforcing part includes two sections disposed at opposite sides of the second surface of the second pouch portion.

3. The pouch of claim 2, wherein each section of the first reinforcing part extends in a longitudinal direction of the first pouch portion.

4. The pouch of claim 3, wherein one end of one section of the first reinforcing part of the first pouch portion partially overlaps the first accommodation groove in a width direction of the pouch perpendicular to the longitudinal direction.

5. The pouch of claim 2, wherein each section of the second reinforcing part extends in a longitudinal direction of the second pouch portion.

6. The pouch of claim 5, wherein one end of one section of the second reinforcing part of the second pouch portion partially overlaps the second accommodation groove in a width direction of the pouch perpendicular to the longitudinal direction.

* * * * *